Patented June 28, 1949

2,474,350

UNITED STATES PATENT OFFICE 2,474,350

POLYSULFONE RESIN PLASTICIZED WITH ESTER OF ORGANIC SULFONIC ACID

George E. Eilerman, Milwaukee, Wis., assignor to Pittsburgh Plate Glass Company, Allegheny County, Pa., a corporation of Pennsylvania No Drawing. Application June 24, 1944, Serial No. 542,014

4 Claims. (Cl. 260—30.8)

The present invention relates to the modification of artificial resins and it has particular relation to the modification of resins of the type obtained by conjointly polymerizing mixtures of olefins and sulfur dioxide.

One object of the invention is to provide a resinous composition of the foregoing type which is plastic, moldable and also is soluble in solvents to form solutions which, when spread upon a surface, will dry to durable and strong adherent films.

This and other objects of the invention will be apparent from consideration of the following specification and the appended claims.

Resinous materials have heretofore been prepared by the interaction of equimolecular proportions of unsaturated hydrocarbons, such as butene and cyclohexene or the like with sulfur dioxide. The resultant resins can be obtained at relatively slight expense, but the use thereof has heretofore been limited because they were relatively insoluble in most of the common solvents and were also relatively unstable at fusion temperatures, so that they could not be molded by most of the conventional molding processes. If prepared as solutions they were not satisfactory as paint or varnish compositions because of a lack of adhesion for many materials, such as glass, metal or the like.

It has now been found possible to vary the properties of a sulfone resin by incorporating with it in suitable proportions esters of organic sulfonic acids. The esters are best described by reference to the following formula:

$$R-\overset{O}{\underset{\underset{X}{\overset{\|}{O}}}{S}}=O$$

wherein R and X represent aryl, aralkyl or alkyl groups which may or may not be further substituted chlorine and other groups.

Some of the possible groups R and X are listed below and for purposes of identification are designated by subscript numerals $R_1R_2—$, $X_1X_2—$ etc. $R_1$ includes:

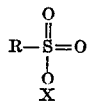

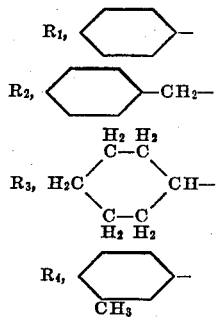

(The CH₃ group being in any possible position.)

X includes:

$X_1$, $CH_3CH_2CH_2CH_2—$ $X_2$, $(CH_3)_3C—$ $X_3$, $(CH_3)_2CHCH_2CH_2—$ $X_4$, $CH_3CH_2CH_2—$ $X_5$, $\begin{matrix} CH_3 \\ \diagdown \\ CH— \\ \diagup \\ CH_3 \end{matrix}$

(CH₃ being in any possible position in the ring);

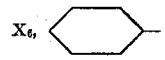

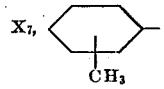

$X_{10}$, $—CH_2—CH_2OH$ $X_{11}$, $—CH_2CH_2—O—CH_2—CH_2OH$ $X_{12}$, $—CH_2CH_2—O—CH_2OCH_2—CH_2OH$ $X_{13}$, $—CH_2CH_2—O—CH_2—CH_2CH_2—O—CH_2CH_3$ $X_{14}$, $—CH_2CH_2—O—CH_2CH_2CH_3$ $X_{15}$, $—CH_2CH_2—O—CH_2CH_2CH_2CH_3$

The modifiers herewith disclosed may be incorporated with substantially any polysulfone resins. Examples of compositions with which the modifiers may be incorporated are disclosed in patents: United States Patents Nos. 2,045,592, 2,112,986, 2,113,584, 2,114,292, 2,128,952, 2,136,028, 2,136,389, 2,138,584, 2,146,276, and 2,154,444.

The modifiers may be incorporated with polysulfone in any convenient manner. Thus, for example, they may be incorporated in a solution of a polysulfone in a volatile solvent and the solvent evaporated, if a solid product is required. They may also be worked in mechanically with the polysulfone and a small amount of volatile solvent.

The resulting compositions which may be in solution or in solid form, may be utilized for a variety of purposes. The solid material is particularly useful for the preparation of molded articles. The molding of polysulfone resins has hitherto presented a difficult problem and the technique has apparently been limited to that of compression molding. It has been found that the plasticized resins as obtained in this invention may be molded by injecting molding processes. Thus it is possible to take advantage of these low cost resins for the fabrication of molded articles by mass production, low cost methods.

The plasticized resins may also be used in solution in suitable solvents as coating compositions for such surfaces as wood, metal, glass, textile fabrics, paper and the like.

The following examples illustrate the invention but are not to be regarded as limiting it in any way:

*Example 1*

An amount of cresyl benzyl sulfonate equivalent to 20% of the weight of dissolved resin was added to a 10% solution of 1-butene polysulfone in acetone. This solution applied to wood, metal or glass yielded, after evaporation of the solvent, continuous adherent films which remained clear and transparent. The unplasticized resin similarly deposited from acetone solution yielded highly brittle films which broke away from the supporting surface as the solvent evaporated.

Other esters of organic sulfonic acids which were similarly incorporated with 1-butene polysulfone including the following:

n-Butyl p-toluene sulfonate
Cresyl p-toluene sulfonate
Ethylene glycol di-p-toluene sulfonate
Cyclohexyl benzyl sulfonate
Phenyl p-toluene sulfonate
Cyclohexyl p-toluene sulfonate
Cresyl benzene sulfonate
Butyl benzyl sulfonate
B-methoxy ethyl p-toluene sulfonate The degree of plasticity of the resin in its final form was regulated by selection from among the above or equivalent compounds and by the proportion of the plasticizer added. Thus, the degree of plasticity of the films described above was enhanced by increasing the proportion of cresyl benzyl sulfonate to 30% of the weight of dissolved resin. In other cases, as for example when a lower degree of plasticity was dsired, the amount of plasticizer was correspondingly reduced or a less active member of the series was chosen from the class defined above.

It will thus be obvious that wide choice may be exercised without departing from the scope of this invention. Likewise, mixtures of plasticizer may be used and, if desired, pigments, fillers and the like may be added. The resulting solutions may be used as such or the acetone may be diluted or replaced by other suitable solvents. If desired, the solvent may be completely removed and the plasticized resin used in solid form.

*Example 2*

Molding powders were prepared by spray drying solutions of plasticized 1-butene polysulfone obtained as described in Example No. 1. Thus, n-butyl p-toluene sulfonate equivalent to 20% of the weight of the dissolved resin was added to a 10% solution of 1-butene polysulfone in acetone. The resulting solution was spray dried to yield a solvent free powder which, in turn, was thoroughly mixed in a ball mill.

This powder could be molded by injection to yield translucent to transparent light yellow to light brown moldings of good strength and surface hardness. Best results were obtained at molding temperatures of 130-140° C. and at pressures up to 5000 lbs. The molded pieces could be removed from the mold immediately without distorting or marring the surface.

It was necessary to exercise care in molding to avoid partial decomposition of the resin. If the resin was retained in the heating cylinder too long before injection into the cold mold, gas bubbles formed which decreased the strength of the finished molded piece. It will thus be obvious that one of the advantages derived from plasticizing the resin lies in improved flow which permits adaptation to the short time cycle of injection molding.

Molding powders were similarly prepared from 1-butene polysulfone plasticized with 10% of cresyl p-toluene sulfonate and with 10% of ethylene glycol di-p-toluene sulfonate.

Other polysulfones may be similarly converted to molding powders. For example, sulfones of vinyl compounds, such as vinyl chloride, vinyl acetate, vinyl alcohol and mixtures of any two of these are contemplated as being within the scope of the invention. Likewise, the acrylic compounds, such as acrylic acid, methacrylic acid and ethyl and methyl esters of acrylic and methacrylic acid are also contemplated. If desired, fillers such as diatomaceous earth, wood, flour, etc. pigments such as $TiO_2$, carbon black, etc., in amounts for example of 5 to 60%, or dyes and the like may be added. Other solvents may be used or the plasticizers may be incorporated with the resin by mechanical means.

*Example 3*

A 15% solution of cyclohexene polysulfone in dioxane was prepared. Cresyl benzyl sulfonate equivalent to 20% of the weight of the dissolved resin was added and the solution was rendered homogeneous by stirring.

This solution applied to wood, metal, glass or other surface yielded, after evaporation of the solvent, continuous adherent films which remained colorless and transparent. Films similarly prepared containing 30% by weight of the plasticizer were more highly plastic and showed no evidence of incompatibility.

*Example 4*

Cresyl benzyl sulfonate equivalent to 30% of the weight if dissolvent resin was added to a 20% solution of styrene polysulfone in acetone. Continuous adherent films were obtained by evaporation of the solvent from films cast on glass. Spray drying of the solution yielded a solvent free powder capable of injection molding.

The forms of the invention herein described are to be considered merely as being illustrative of the invention. It will be evident that numerous modifications may be made therein without departing from the spirit of the invention or the scope of the claims.

This application is a continuation in part of my abandoned copending application Serial No. 327,999, filed April 5, 1940, and entitled "Resin composition."

What I claim is:

1. As a new composition of matter, a resin comprising a conjoint polymerization product of an olefin hydrocarbon and sulfur dioxide, said resin being plasticized with the ester of cresol and benzyl sulfonic acid.

2. As a new composition of matter, a resin comprising a conjoint polymerization product of an olefin hydrocarbon and sulfur dioxide, said resin being plasticized with about 20 per cent of the ester of cresol and benzyl sulfonic acid upon the basis of resin content of the mixture.

3. As a new composition of matter, a resin comprising a conjoint polymerization product of butene and sulfur dioxide, said resin being plasticized with the ester of cresol and benzyl sulfonic acid.

4. As a new composition of matter, a resin comprising a conjoint polymerization product of butene and sulfur dioxide, said resin being plasticized with the ester of cresol and benzyl sulfonic acid in the ratio of about 20 per cent based upon resin content.

GEORGE E. EILERMAN.

REFERENCES CITED

The following references are of record in the file of this patent:

UNITED STATES PATENTS

| Number | Name | Date |
| --- | --- | --- |
| 758,335 | Schmidt | Apr. 26, 1904 |
| 2,169,363 | Marvel et al. | Aug. 15, 1939 |
| 2,182,360 | Smith | Dec. 5, 1939 |
| 2,373,298 | Dougherty et al. | Apr. 10, 1945 |